United States Patent [19]
Sheldon

[11] Patent Number: 5,832,783
[45] Date of Patent: Nov. 10, 1998

[54] THREE-AXIS MACHINE STRUCTURE

[75] Inventor: Paul C. Sheldon, Mequon, Wis.

[73] Assignee: Sheldon/Van Someren Inc., Wauwatosa, Wis.

[21] Appl. No.: 735,101

[22] Filed: Oct. 22, 1996

[51] Int. Cl.⁶ .................................. B25J 1/02; B23Q 1/25
[52] U.S. Cl. ........................ 74/490.03; 409/235; 414/917; 901/23
[58] Field of Search ........................... 74/490.01, 490.03; 248/631, 653, 654; 408/234; 409/145, 201, 216, 235, 241; 901/22, 23, 15; 414/917

[56] References Cited

U.S. PATENT DOCUMENTS

| 4,651,589 | 3/1987 | Lambert | 901/22 X |
| 5,259,710 | 11/1993 | Charles | 409/235 |
| 5,401,128 | 3/1995 | Lindem et al. | 409/201 X |

FOREIGN PATENT DOCUMENTS

| 494565 | 6/1992 | European Pat. Off. | 901/23 X |

OTHER PUBLICATIONS

Jean–Pierre Merlet, published on the Internet at http://www.inria.fr/prisme/personnel/merlet/merlet eng.html, § Parallel manipulators, drawings and references for Manipulateurs a 3 degres de liberte.

Primary Examiner—Charles A. Marmor
Assistant Examiner—Troy Grabow
Attorney, Agent, or Firm—Robert A. Van Someren

[57] ABSTRACT

A mechanical control structure is used with a machine, such as a machine tool. The control structure includes a base and a tool support member connected by a linkage assembly having three linkages arranged in a triangular pattern. The linkages cooperate to prevent rotational movement of the tool support member relative to the base along any of the three rotational axes. Three linear actuators are also connected between the base and the tool support member to move the tool support member relative to the base along a predetermined path.

18 Claims, 4 Drawing Sheets

THREE-AXIS MACHINE STRUCTURE

This document is generally related to the patent application entitled Three-axis Machine for Rapid and Rigid Manipulation of Components, Ser. No. 08/707,125, filed on Sep. 3, 1996.

FIELD OF THE INVENTION

The present invention relates generally to a structure designed to control the movement of an object through three dimensional space without permitting rotational movement of the object along the three rotational axes, and particularly to a structure that may be used with a machine, such as a three-axis machine tool, to control the movement of an object, such as a tool.

BACKGROUND OF THE INVENTION

Generally, an object can be moved through space with six degrees of freedom. In other words, the object can be moved along six different axes, three of which are linear axes, and three of which are rotational axes. The three linear axis are commonly known as the x-axis, y-axis and z-axis. An object's movement through three dimensional space from one point to another can be tracked along the three linear axes, x, y and z. However, that same object can twist, i.e. pivot or rotate, about each of the linear axes. Thus, there are three rotational degrees of freedom that are commonly represented by three rotational axes, referred to as the a-axis, b-axis and c-axis. The rotational axes sometimes also are known as roll, pitch and yaw.

It should be noted that rotational movement or rotational degrees of freedom of movement of the object are understood as rotation of the object about the linear axes, x, y, z extending through the object. Reference to the restriction of rotational movement of the object does not imply that the object cannot be moved along arcuate or circular paths from one point to another in space. Such arcuate or circular travel can be defined solely as movement along the three linear axes if no twisting of the object occurs.

Depending on the requisite manipulation of an object, machines are designed to move various objects through space with one to six degrees of freedom. For example, machine tools used for milling, drilling, and grinding workpieces are sometimes designed to manipulate an object, e.g. a cutting tool, along all six axes. However, many applications only require the object be moved with the three degrees of freedom defined by the three linear axes. In fact, in both situations, it often is undesirable to allow any undesired twisting or rotational movement of the object, e.g. tool, because this can lead to poorly formed parts that do not meet modern tolerance requirements. This is particularly true with machines that generate substantial force loads, such as loads that occur during milling or drilling operations.

To combat the undesirable twisting and to maintain operational accuracy and precision, many three-axis machines use large cast components that move along precisely ground ways. The large, cast components reduce twisting of the object being moved, e.g., a spindle head for a drill or milling cutter. Simultaneously, the ways guide the heavy cast machine structures as they are moved along the x, y and z axes. Typically, such a machine includes a separate machine structure and a separate way or ways for each axis of movement. This leads to increased time and expense in building and maintaining the machine. Additionally, because of the mass of the solid machine structures, these machines are relatively slow in moving an object from one point to another.

The present invention addresses the foregoing drawbacks of existing three-axis machines.

SUMMARY OF THE INVENTION

The present invention features a control structure for use in cooperation with a machine to limit the rotational movement of an object along the rotational axes as the object is moved by the machine through three dimensional space along a predetermined path. The control structure includes a base structure and an object supporting member. A linkage assembly is connected between the base structure and the object mounting member. The linkage assembly includes a plurality of linkages with each link having a first link and a second link pivotably connected to one another. Each linkage can be oriented with the first link pivotably attached to either the base structure or the object supporting member. For example, the first link of each linkage could be pivotably mounted to the base structure. In this embodiment, each first link is unpowered and freely pivotable about an axis. However, each first link is constrained to pivotable motion with one degree of freedom about that axis, The second link includes a pair of arms that are pivotably mounted to the first link by pivot joints that permit at least two degrees of rotational freedom. In the embodiment being described, the pair of arms are also pivotably connected to the object supporting member by pivot joints that permit movement of the arm with at least two degrees of freedom. Exemplary pivot joints include trunnion joints or ball and socket joints. Preferably, the arms of each pair of arms are of equal length and connected such that they remain parallel to one another as the object supporting member is moved relative to the base structure.

Typically, three linkages oriented in a generally triangular pattern are connected between the base structure and the object supporting member. Thus, the linkage assembly is able to restrict movement of the object supporting member relative to the base structure along all three rotational axes.

According to a more specific aspect of the invention, an apparatus is provided that can be used to move an object through three dimensional space while restricting the object from rotating along the three rotational axes. The apparatus includes a base structure and a object supporting member connected by a linkage assembly. The linkage assembly includes three linkages arranged to prevent rotational movement of the object supporting member relative to the base structure along the three rotational axes. Each linkage includes one end that is connected to either the base structure or the object supporting member and constrained to pivotable motion with one degree of freedom about an axis. Each linkage also includes a second end that is connected to the other of the base structure or the object supporting member for pivotable motion with at least two degrees of freedom. Preferably, each linkage includes a first link and a second link having a pair of parallel, equal length arms.

A plurality of linear actuators are oriented to move the object supporting member relative to the base structure. For example, linear actuators, such as ball screws or linear motors, can be pivotably connected to the base structure and to the object supporting member to move the object supporting member relative to the base structure along a predetermined path. Typically, three, non-parallel linear actuators would be connected between the base structure and object supporting member.

According to yet another aspect of the invention, a method is provided for preparing a three-axis machine tool capable of moving an object through three dimensional space without permitting movement of the object along the three rotational axes. The method comprises the steps of preparing a first structure and preparing a second structure. The method further includes the steps of assembling at least three linkages by pivotably connecting a first link to a second link, wherein the second link has a pair of equal-length arms pivotably mounted to the first link. The equal-length arms are connected to the first link by pivot joints that permit at least two degrees of freedom of movement.

Further, the first link of each linkage is connected to one of the first or second structures and constrained to pivotable motion with one degree of freedom about a corresponding axis. The equal-length arms are similarly pivotably connected to the other of the first or second structures at a pivot joint. However, this latter pivot joint allows the equal-length arms to pivot with at least two degrees of freedom. Finally, the method includes the step of attaching linear actuators to move the first structure relative to the second structure along a predetermined path.

BRIEF DESCRIPTION OF THE DRAWINGS

The invention will hereafter be described with reference to the accompanying drawings, where like reference numerals denote like elements, and.

DETAILED DESCRIPTION OF THE PREFERRED EMBODIMENTS

In many operations, machines are required to move an object through three dimensional space without permitting twisting of the object along any of the rotational axes a, b or c. The present invention provides, in part, a simple mechanical control structure that can be used in a variety of ways or with a variety of machines to restrict rotational movement of objects as they are transported through space.

Figure 1:
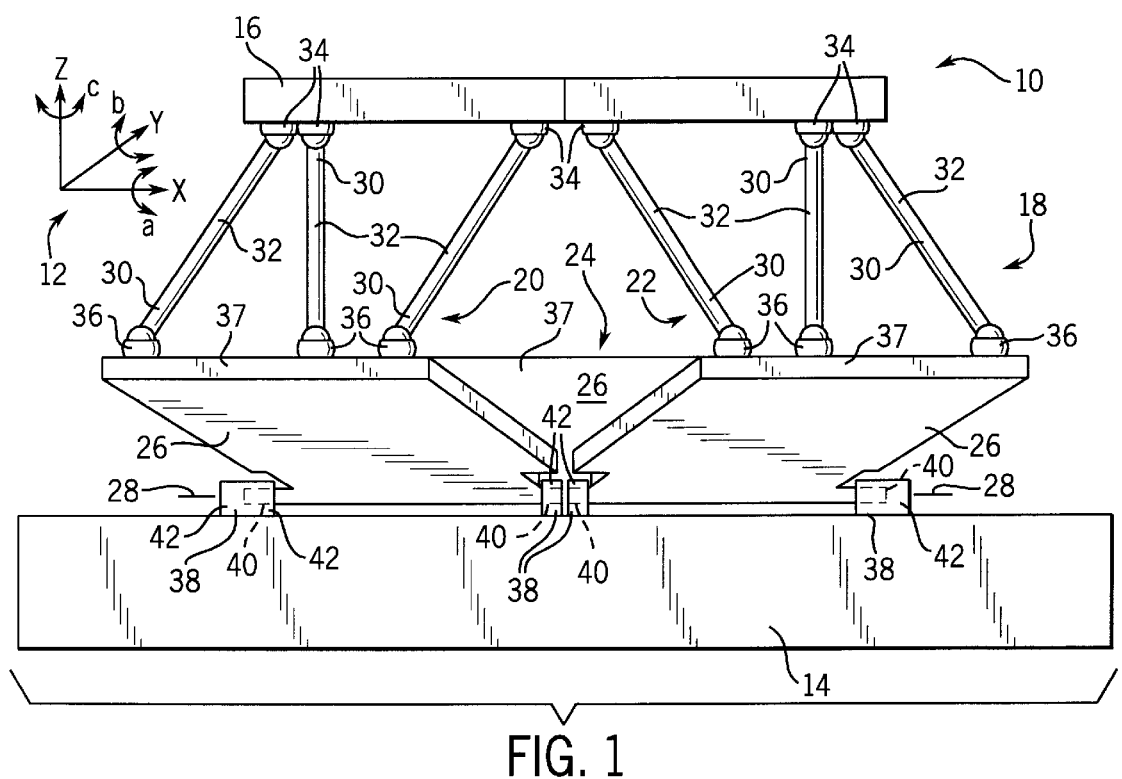
FIG. 1 is a front view of a mechanical control structure for use with a machine, according to a preferred embodiment of the present invention.

Referring generally to FIG. 1, a mechanical control structure 10, according to a preferred embodiment of the invention, is illustrated. Control structure 10 uses several linkages properly positioned to limit the rotational movement of an object along rotational axes a, b and c as the object is moved through three dimensional space defined by linear axes x, y and z. (See the diagram labeled by reference numeral 12 in FIG. 1) Specifically, control structure 10 includes a base or support structure 14 and an object supporting member 16. Base structure 14 and object supporting member 16 are connected by a linkage assembly 18 that prevents object supporting member 16 from twisting with respect to base structure 14 along any of the rotational axes a, b or c.

Linkage assembly 18 includes a plurality of linkages 20, 22 and 24. In the preferred embodiment, as illustrated in FIG. 1, linkage assembly 18 includes three linkages that are connected to object supporting member 16 and base structure 14, respectively, in a generally triangular pattern.

Each linkage 20, 22 and 24 includes a first link 26 that is pivotably mounted to either base structure 14 or object supporting member 16. In the illustrated embodiment, first links 26 extend from base structure 14, but the linkages 20, 22 and 24 could be reversed such that the first links 26 are mounted to object supporting member 16.

As illustrated, each first link is pivotably mounted to base structure 14 for pivotable motion with one degree of freedom about an axis 28. The axis 28 of each linkage 20, 22 and 24 is oriented differently. In the embodiment of FIG. 1, the three axes 28 generally form an equilateral triangle. However, the exact orientation of the linkages potentially could change depending on the specific application of mechanical control structure 10.

Each linkage 20, 22 and 24 also includes a second link 30 pivotably connected to both object supporting member 16 and first link 26. As mentioned above, one or more of the linkages could be reversed so that first link 26 would be connected to object supporting member 16 and second link 30 would be connected to base structure 14. Each second link 30 includes a pair of arm members 32 that preferably are of equal length and parallel to each other. Additionally, each arm member 32 is pivotably connected by a pivot joint 34 to object supporting member 16 and by a pivot joint 36 to a corresponding first link 26, as illustrated in FIG. 1. Pivot joints 34 and 36 can have a variety of forms, but must provide each arm member 32 with at least two degrees of freedom. Thus, trunnion style joints or ball and socket style joints work well in appropriate applications.

Alternatively, first links 26 can comprise pairs of individual arm members constrained to pivot together about their corresponding axis 28. However, in many applications, it is essential that each first link 26 includes a reinforced region 37, such as reinforcement struts or the illustrated plate spanning first link 26, to provide greater structural rigidity and thereby maintain pivot joints 36 at their precise locations with respect to each other. A variety of pivot joints can be used to constrain each first link 26 to pivotable motion about its corresponding axis 28 with one degree of freedom. An exemplary embodiment is illustrated in which each first link 26 is connected to a pair of unidirectional pivot joints 38. In this embodiment, each first link 26 has a pair of pins 40 that extend outwardly to be rotatably received by a pair of bearing blocks 42 affixed to base structure 14.

Although control structure 10 has been described for use with larger machines, it could also be designed for use on a microscopic level to move objects, such as minute particles, molecules or atoms. For instance, in the science of Micro Electromechanical Systems (often referred to as MEMS) microscopic machines are used to manipulate tiny particles, including moving them from one site to another. In this environment, the components of an exemplary control structure 10 are made from a material or materials, such as silicon, that can be formed on a microscopic level. In this example, first links 26 include reinforced region 37 to preferably form a plate similar to that illustrated in FIG. 1. Each plate is mounted to base structure 14, for instance, by a unidirectional pivot joint 38 having the form of a flexural, or other, hinge permitting pivotable motion with one degree of freedom about its axis 28. Similarly, arm members 32 are mounted to object supporting member 16 and first link 26 by pivot joints 34 and 36, respectively, that have the form of flexural, or other, hinges permitting multiple degrees of freedom in pivotal motion.

Exemplary flexural hinges are formed by reducing the cross-section of a member sufficiently to permit bending, i.e. pivoting, at a desired location. With unidirectional joints 38, the cross-section of each first link 26 is reduced in a single direction at its connection to base structure 14. However, with pivot joints 34 and 36, the cross-section of each arm member 32 preferably is reduced about its entire perimeter to permit pivotal motion in multiple directions. Other types of joints also may work well in these applications, but the use of flexural joints on microscopic structures is advantageous, because it simplifies the manufacture of these devices.

Figure 4:
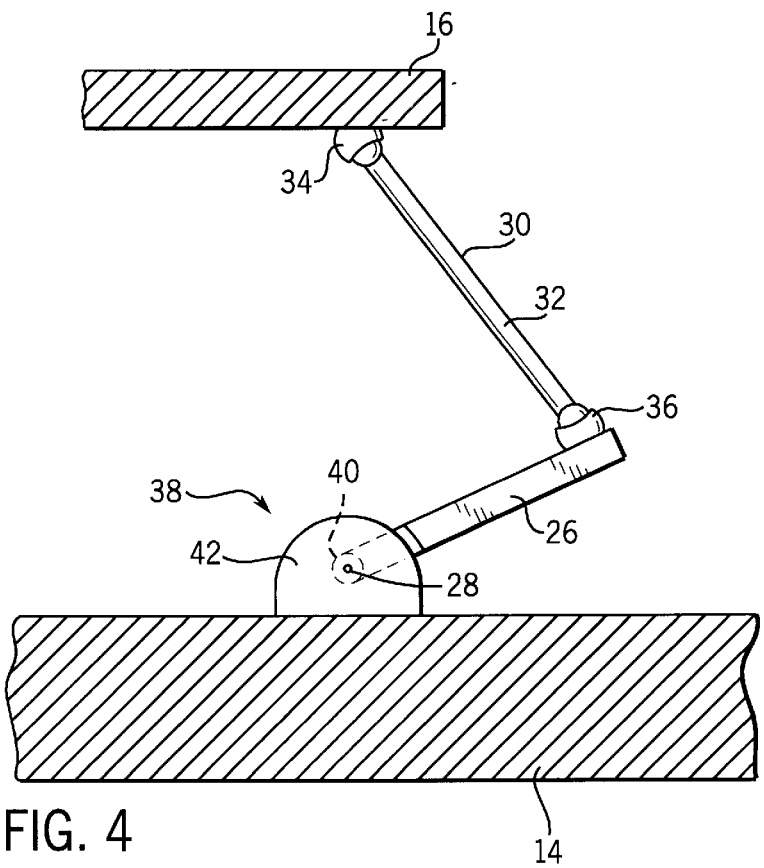
FIG. 4 is a side view of a linkage taken generally along line 4—4 of FIG. 3.

As illustrated best in FIGS. 1 and 4, first links 26 extend laterally outward from pivot joint 38. Similarly, second links 30 extend laterally outward from pivot joints 34 where they are attached to object supporting member 16. Thus, the hinge pivot joint 36 is the most laterally outlying joint on each linkage 20, 22 and 24. This design and orientation of linkages 20, 22 and 24 provide mechanical control structure 10 with a relatively small size or footprint. However, in applications where space is not a primary consideration, the first link 26 and second link 30 can be oriented differently. For example, first links 26 can be oriented so that their pivot joints 38 are the most outlying joint in a lateral direction. In other words, each first link 26 can extend laterally inward to pivot joint 36, while second links 30 still extend laterally outward from pivot joint 34 on object supporting member 16 to pivot joint 36.

Figure 2:
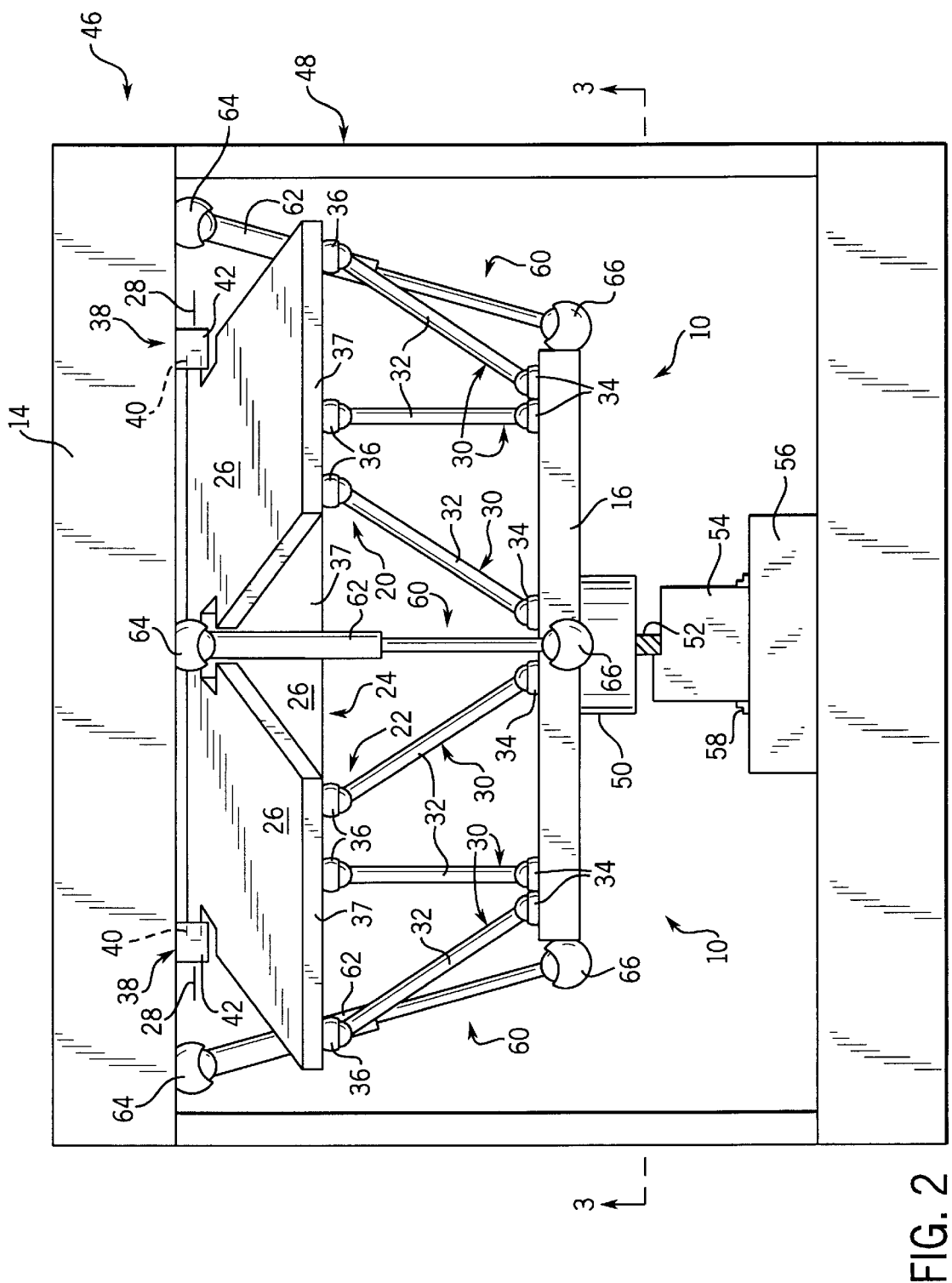
FIG. 2 is a front view of a machine, such as a machine tool, according to a preferred embodiment of the present invention and incorporating the mechanical control structure illustrated in FIG. 1.
Figure 3:
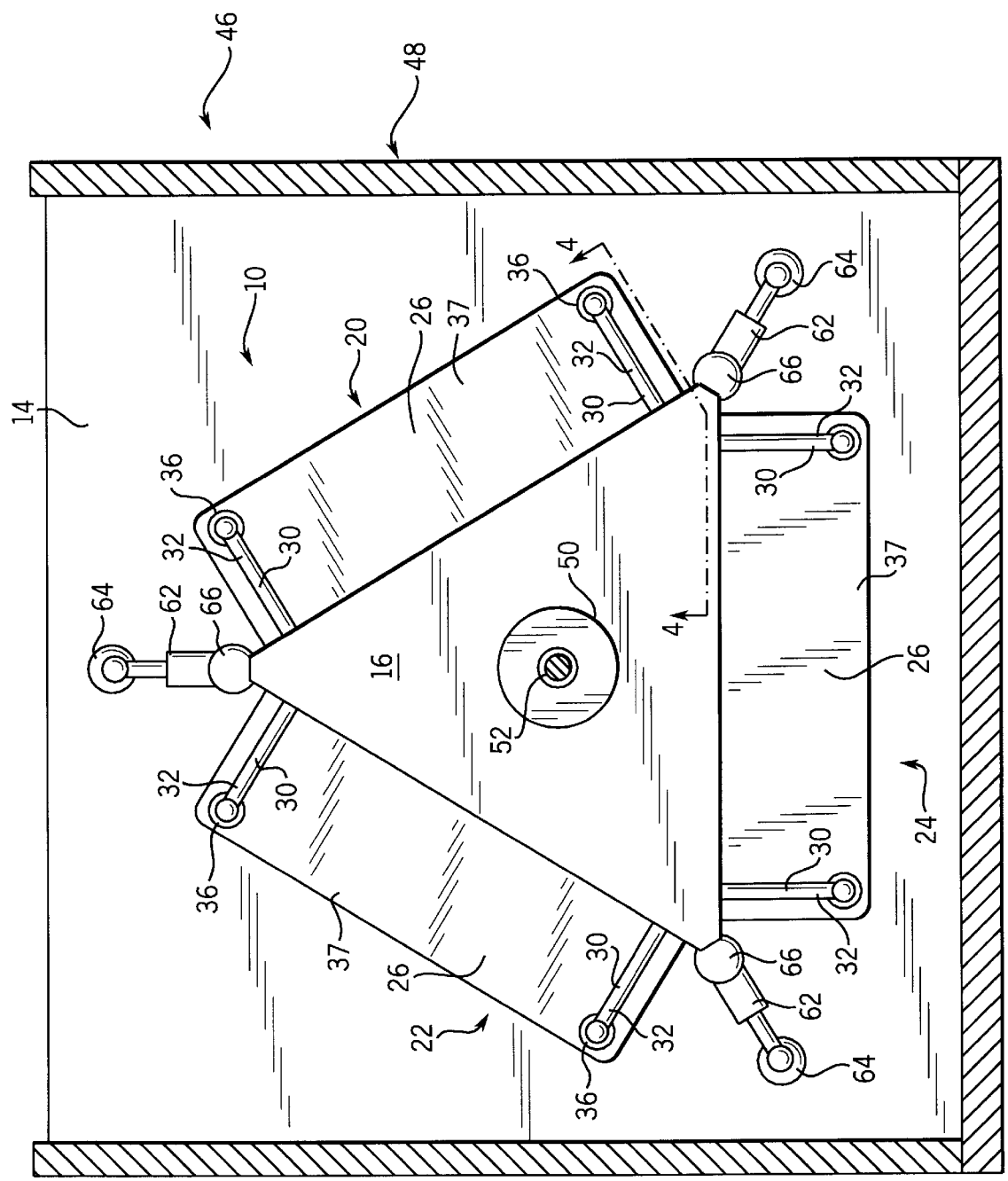
FIG. 3 is a cross sectional view taken generally along line 3—3 of FIG. 2.

Referring generally to FIGS. 2 and 3, a machine 46 incorporates machine control structure 10 according to another aspect of the present invention. Machine 46 is designed to move an object through three dimensional space without permitting any movement, i.e., twisting, along the rotational axes a, b or c. In the specific illustrated embodiment, machine 46 is a machine tool in which machine control structure 10 is mounted in an inverted position from that shown in FIG. 1. It should be noted that control structure 10 can be vertical, inverted, horizontal or lie in any orientation that facilitates the desired movement of object supporting member 16 through space.

In FIGS. 2 and 3, base structure 14 is mounted to a framework 48. Object supporting member 16 carries a tool 50, such as a spindle for receiving a cutter 52, such as a milling cutter. Tool 50 is moved through space along a predetermined path to interact with another object, such as a workpiece 54. In the illustrated embodiment, workpiece 54 is mounted to a fixture 56 by an appropriate clamping mechanism 58 as is commonly done during the cutting of workpieces by machine tools. Fixture 56 is securely mounted to framework 48 to hold workpiece 54 in place as various three-axis cutting operations are performed.

The movement of object supporting member 16 and tool 50 is induced by an actuator system 60. In this embodiment, actuator system 60 includes a plurality of linear actuators 62. Because machine control structure 10 prevents any rotational movement of object supporting member 16 or tool 50, it is only necessary that three linear actuators 62 be used to impart three axis movement of tool 50 through three dimensional space as defined by the linear axes x, y and z. Tool 50 can be moved along desired paths to desired locations simply by selectively controlling the extension and retraction of each linear actuator 62. This would typically be controlled by a machine controller, such as a computer numerical control system. For example, a variety of linear actuators, such as ball screws, linear motors or hydraulic cylinders could be used to move object supporting member 16 relative to base structure 14. As is known to those of ordinary skill in the machine tool industry, these types of actuators include sensors that accurately detect the extension and retraction of each actuator. The controller is thus able to provide signals that direct the extension and retraction of each linear actuator to move object supporting member 16 and tool 50 to appropriate pre-programmed locations or along pre-programmed paths of travel.

In the illustrated embodiment, linear actuators 62 are each connected between base structure 14 and object supporting member 16. Each linear actuator 62 is pivotably mounted to base structure 14 at a pivot joint 64 and pivotably mounted to object supporting member 16 at a pivot joint 66. As illustrated best in FIG. 3, the three pivot joints 64 form the points of a triangle, and the pivot joints 66 also form the points of a triangle smaller in size than that formed by pivot joints 64. In other words, linear actuators 62 are angled inwardly from base structure 14 to object supporting member 16. Further, each of the pivot joints 64 and 66 should have at least two degrees of freedom of motion. Exemplary joints include trunnion style joints and ball and socket joints, as illustrated.

Figure 5:
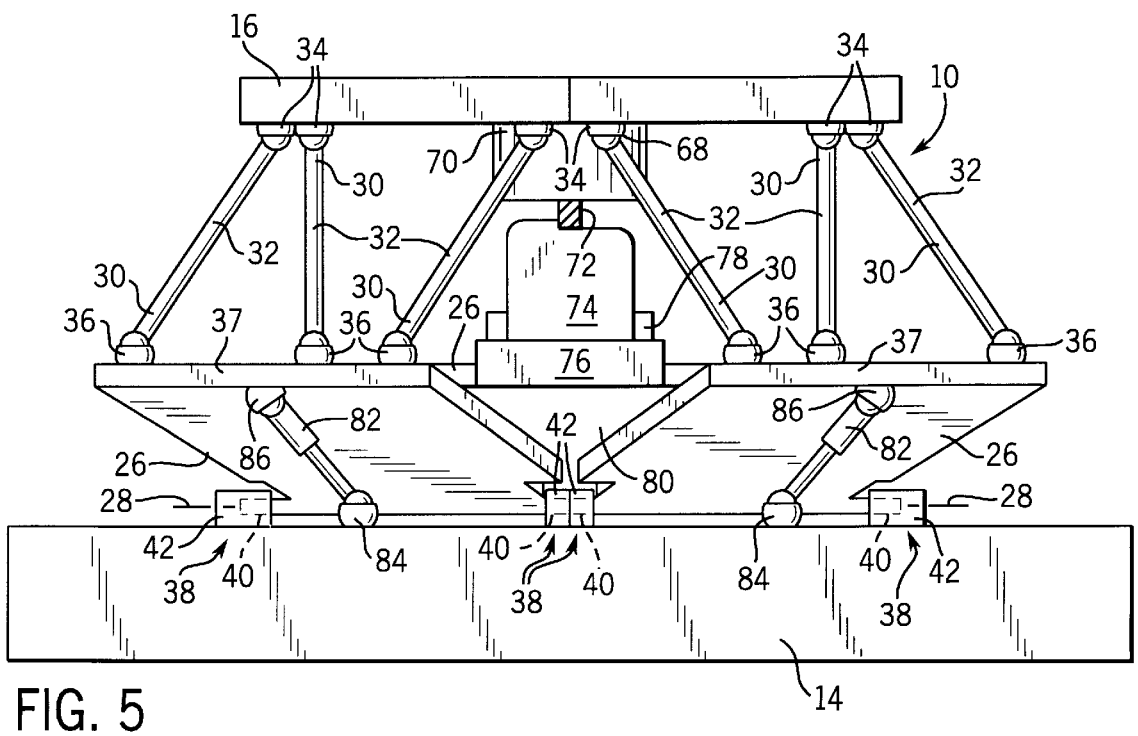
FIG. 5 is an alternate embodiment of a machine, such a machine tool, incorporating the mechanical control structure illustrated in FIG. 1.

In the embodiment of FIGS. 2 and 3, the object being moved, e.g., tool 50, and the object with which it interacts, e.g., workpiece 54, are external to control structure 10. However, as illustrated in FIG. 5, an object 68, such as a spindle 70 having a cutter 72 can be mounted on the inside of object supporting member 16 to interact with, for instance, a workpiece 74 which is mounted in the interior of machine control structure 10. Again, workpiece 74 is typically mounted to a fixture 76 having a clamping mechanism 78 to hold it securely in place. Fixture 76 may be mounted to a platform 80 on base structure 14.

Furthermore, the actuators do not necessarily need to extend between base structure 14 and object supporting member 16. In some applications, it may be advantageous to directly manipulate components of machine control structure 10. For example, linear actuators 82 can be connected between base structure 14 and first links 26 as illustrated in FIG. 5. In this embodiment, one end of each actuator 82 is pivotably connected to base structure 14 at a pivot joint 84. The other end of each actuator 82 is pivotably connected to a corresponding first link 26 at a pivot joint 86, as illustrated. Each of the three actuators 82 is independently controlled to manipulate the pivoting motion of each first link 26. By appropriately controlling this motion, object supporting member 16 and object 68 can be moved to desired pre-programmed locations or along predetermined paths. However, the combination of the first links 26 and parallel, equal-length arms 32 of each linkage 20, 22 and 24 still prevent undesired rotational movement of object supporting member 16 and object 68 along the rotational axes a, b and c. Also, for some applications, rotary actuators could be used in lieu of linear actuators. For example, linear actuators 82 could be replaced with rotary actuators connected to an extended pin 40 on each first link 26 to manipulate the pivoting of each first link 46.

It will be understood that the foregoing description is of a preferred exemplary embodiment of this invention and that the invention is not limited to the specific forms shown. For example, the links within each linkage could have a variety of forms depending on weight and rigidity requirements for a given application. A variety of actuators can be used, and the mechanical control structure can be incorporated into many types of machines that are required to move objects from one location to another without undue twisting. These and other modifications may be made in the design and arrangement of the elements without departing from the scope of the invention as expressed in the appended claims.

What is claimed:

1. A mechanical control structure for use in cooperation with a machine to limit the rotational movement of an object along the rotational axes as the object is moved by the machine through three dimensional space along a predetermined path, comprising:
   a base structure;
   an object supporting member; and
   a linkage assembly comprising a plurality of linkages, each linkage having:
      a first link pivotably mounted to one of the base structure or the object supporting member such that the first link is constrained to pivot about an axis with one degree of freedom, the first link including a reinforced region to provide greater structural rigidity; and
      a second link having a pair of arm members, each arm member being connected between a pivot joint on the first link and a pivot joint on the other of the base structure or the object supporting member, wherein the linkage assembly restricts movement of the object supporting member relative to the base structure along the rotational axes, further wherein the arm members within each pair of arm members are configured to remain parallel to one another as the object supporting member moves relative to the base structure.

2. The mechanical control structure as recited in claim 1, wherein the first link is pivotably mounted to the base structure.

3. The mechanical control structure as recited in claim 1, wherein the linkage assembly includes three linkages.

4. The mechanical control structure as recited in claim 3, wherein the linkages are arranged in a generally triangular pattern.

5. The mechanical control structure as recited in claim 3, wherein the pivot joints on the first link and on the other of the base structure or the object supporting member permit pivotable motion of each member with at least two degrees of freedom.

6. The mechanical control structure as recited in claim 5, wherein the arm members within each pair of arm members are equal length.

7. The mechanical control structure as recited in claim 5, wherein all arm members are equal length.

8. The mechanical control structure as recited in claim 4, wherein the first link and the second link both extend laterally outward such that they are pivotably joined at a location lying laterally outward from the locations at which the first and second links are connected to the base structure and the object supporting structure.

9. An apparatus that can be used to move an object through three dimensional space while restricting the object from rotating along the three rotational axes, comprising:
   a base structure;
   an object supporting member;
   a linkage assembly including three linkages, each linkage having:
      a first link pivotably mounted to one of the base structure or the object supporting member such that the first link is constrained to pivot about an axis with one degree of freedom, the first link including a reinforced region to provide greater structural rigidity; and
      a second link having a pair of arm members, each arm member being connected between a pivot joint on the first link and a pivot joint on the other of the base structure or the object supporting member, wherein each pair of arm members remains parallel to permit the linkage assembly to prevent movement of the object supporting member relative to the base structure along the rotational axes; and
   a plurality of linear actuators oriented to move the object supporting member relative to the base structure.

10. The apparatus as recited in claim 9, wherein each linear actuator is pivotably connected to both the base structure and to the object supporting member.

11. The apparatus as recited in claim 10, wherein the plurality of linear actuators includes three linear actuators.

12. The apparatus as recited in claim 9, wherein the first link of each linkage includes a reinforced region.

13. The apparatus as recited in claim 12, wherein the first link and second link are oriented such that each pivot joint is disposed laterally outward from the locations at which each linkage is connected to the base structure and to the object supporting member.

14. The apparatus as recited in claim 13, further comprising a tool mounted to the object supporting member and a fixture for holding a workpiece, wherein the linear actuators may be controlled to move the tool along a predetermined path with respect to the fixture.

15. The apparatus as recited in claim 14, wherein the tool and the fixture are mounted between the base structure and the object supporting member.

16. The apparatus as recited in claim 14, wherein the tool is oriented to interact with a workpiece mounted to the fixture, and the fixture is located externally of the base structure and object supporting member.

17. A mechanical control structure for use in cooperation with a machine to limit the rotational movement of an object along the rotational axes as the object is moved by the machine through three dimensional space along a predetermined path, comprising:
   a base structure;
   an object supporting member; and
   a linkage assembly comprising a plurality of linkages, each linkage having:
      a first link pivotably mounted to one of the base structure or the object supporting member such that the first link is constrained to pivot about an axis with one degree of freedom; and
      a second link having a pair of arm members, each arm member being connected between a pivot joint on the first link and a pivot joint on the other of the base structure or the object supporting member, wherein the linkage assembly restricts movement of the object supporting member relative to the base structure along the rotational axes, further wherein the first link and the second link both extend laterally outward such that they are pivotably joined at a location lying laterally outward from the locations at which the first and second links are connected to the base structure and the object supporting structure, wherein the arm members of each second link are of equal length and remain parallel to each other as the object supporting member moves relative to the base structure.

18. The mechanical control structure as recited in claim 17, further comprising a plurality of actuators oriented to move the object supporting member relative to the base structure.

* * * * *